United States Patent [19]

Rabbit

[11] Patent Number: 4,718,711
[45] Date of Patent: Jan. 12, 1988

[54] PORTABLE CAR PORT

[76] Inventor: David Rabbit, 1160 Sugar Sand Blvd., #401, Singer Island, Fla. 33404

[21] Appl. No.: 894,684

[22] Filed: Aug. 8, 1986

[51] Int. Cl.⁴ .............................................. B60J 11/00
[52] U.S. Cl. ..................................................... 296/136
[58] Field of Search ...................... 296/136; 150/52 K; 135/88

[56] References Cited

U.S. PATENT DOCUMENTS

| | | | |
|---|---|---|---|
| 2,646,097 | 7/1953 | Gaverth et al. | 150/52 K |
| 2,950,749 | 8/1960 | MacDonald | 150/52 K |
| 3,785,697 | 11/1972 | Dubbs | 296/136 |
| 3,992,053 | 9/1974 | Hrytzak | 296/136 |
| 4,050,734 | 9/1977 | Richard | 296/98 |
| 4,164,233 | 3/1978 | McAndrews | 296/136 |
| 4,432,581 | 1/1982 | Guma | 296/136 |
| 4,519,644 | 6/1983 | Song | 296/136 |
| 4,596,418 | 11/1984 | Koh | 296/136 |

FOREIGN PATENT DOCUMENTS 2362626 6/1975 Fed. Rep. of Germany .
23706 8/1979 Japan .

*Primary Examiner*—Robert R. Song
*Attorney, Agent, or Firm*—Malin, Haley & McHale

[57] ABSTRACT

A portable car port used as a weather shelter, the car port is lightweight and instantly available for use and storage. The car port is self contained and is stored in the trunk area of an automobile. This car port is simply attached to an interior auto trunk hinge. When the car port is removed from the trunk of the auto or car and the trunk lid is closed, the car port will be automatically mounted on the horizontal bar on the outside of the trunk for instant use. The horizontal bar mounting provides a rear anchor point for the canopy of the portable car port. A second horizontal bar, a roll bar, is available adjacent the rear horizontal bar for placing the canopy over the entire surface of the auto from the rear of the auto to the front of the auto. The roll bar is rolled over the auto while the user walks towards the front of the auto unrolling the canopy over the entire auto length. The canopy and the roll bar has front horizontal anchors which are in position for anchoring the front horizontal roll bar at the end of the canopy to the front of the auto. The resilient or elastic cord on each side of the canopy moves downward under the pressure of attaching hooks to the contour the canopy neatly and tidily to the auto.

9 Claims, 16 Drawing Figures

U.S. Patent    Jan. 12, 1988    Sheet 1 of 4    4,718,711
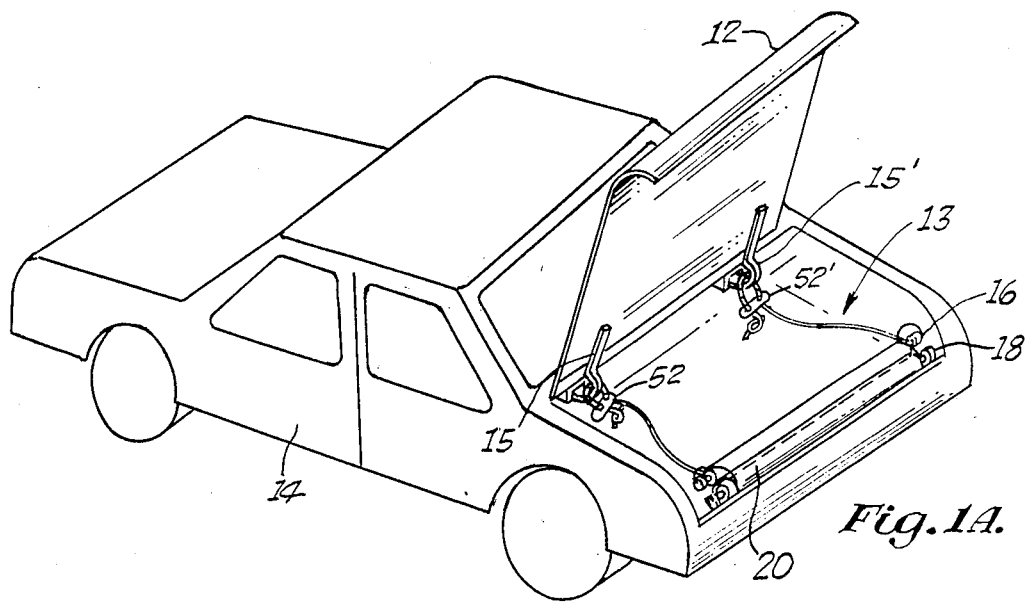
Fig. 1A.
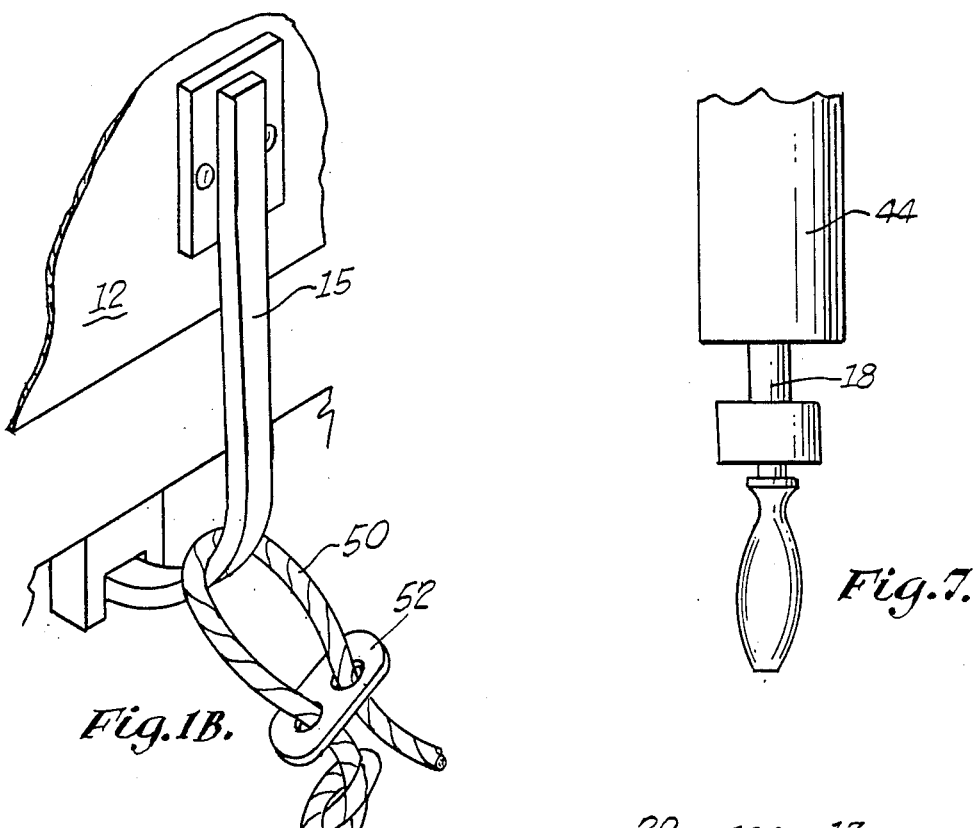
Fig. 1B.
Fig. 7.
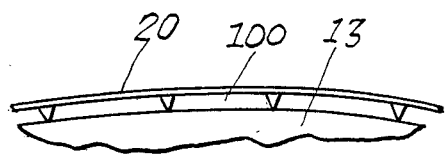
Fig. 8.

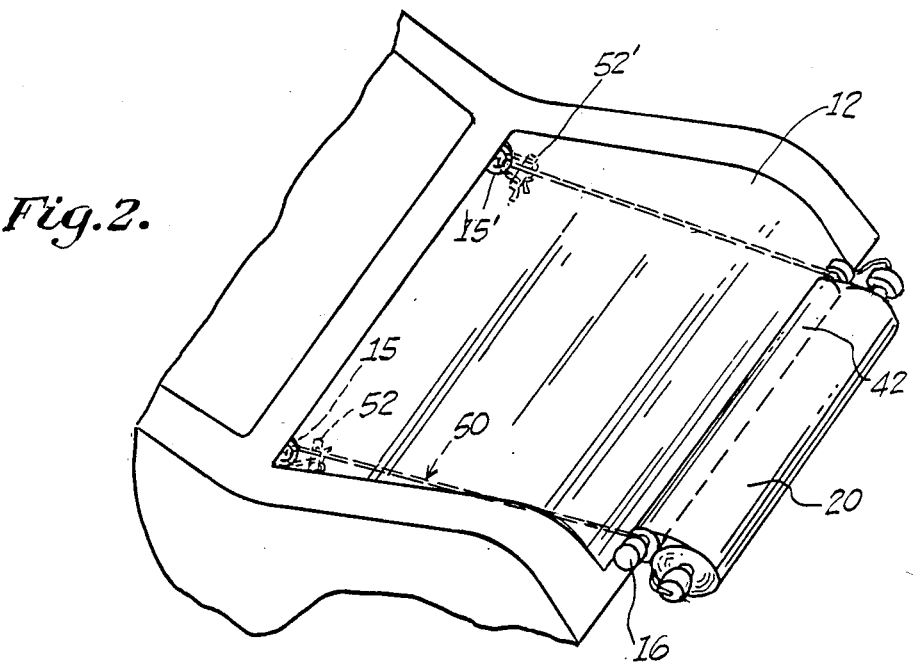
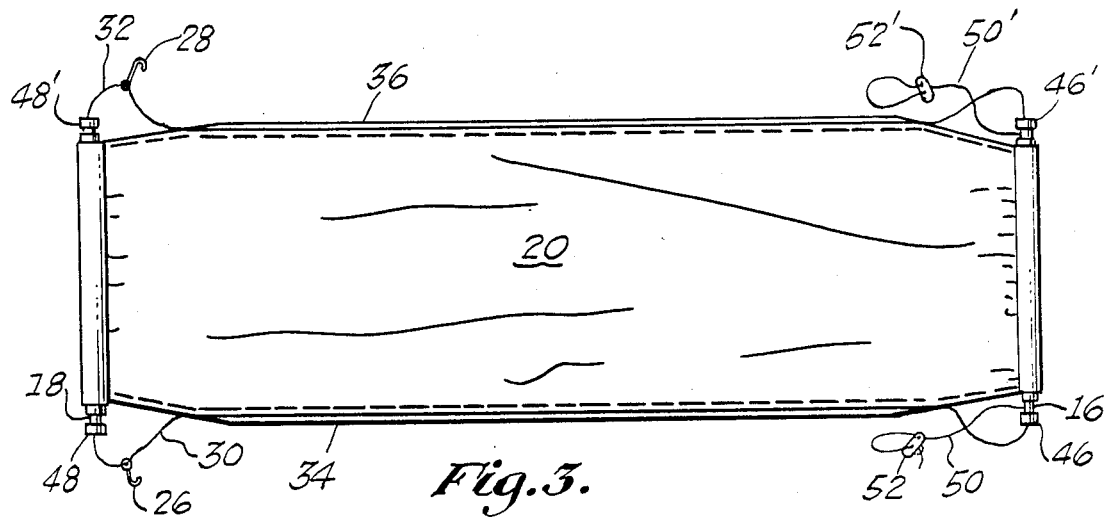
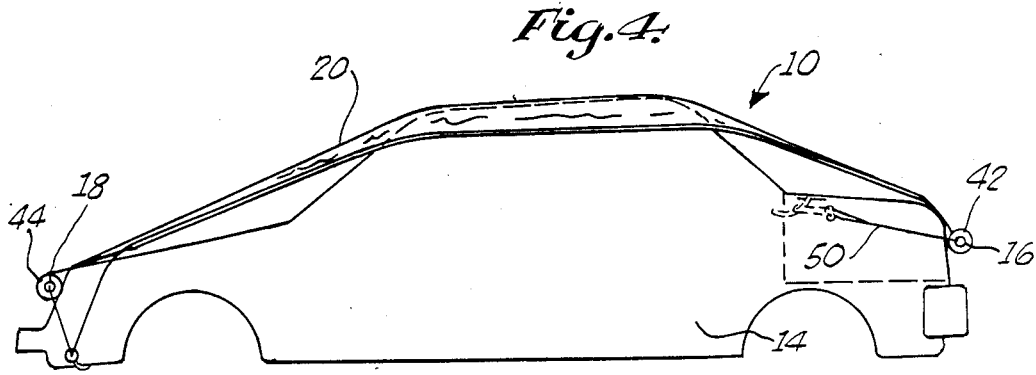

PORTABLE CAR PORT

BACKGROUND OF THE INVENTION

In the past various car covers have been used to protect automobiles. Prior car covers were heavy and require various steps to unfold and store the covers. Such car covers were bulky and disoriented in appearance. Exterior attached devices have also been connected to cars to roll up the cover when not in use. Prior covers were designed to fit the entire body of the car and had to be adjusted all around the car and over the doors of the car. Such car covers held heat and moisture. All of these devices were difficult and time consuming to put on and take off the car. Once the prior device was on the car, the owner had no access to the car.

The present invention is instantly available for use and storage. The disclosed invention is light weight. The new and improved device is pre-directed for easy use and storage. The device is automatically self mounted by a new and improved connecting means. The device is compact and is automatically positioned on the outside of the trunk of the car. The cover protects the car from harmful ultra violet rays. The new and improved design can be rapidly applied over the car body and is self adjusting and self ventilating. The invention is placed over the car in seconds and the device is quickly connected to the car. The inside of the car is still accessible even after the new and improved car cover is positioned in place over the car.

BRIEF DESCRIPTION OF THE INVENTION

This is a new and improved portable car port used as a weather shelter. The car port is lightweight and instantly available for use and storage. The car port is self contained and is stored in the trunk area of an automobile. This car port is simply attached to an interior auto trunk hinge. When the car port is removed from the trunk of the auto or car and the trunk lid is closed, the car port will be automatically mounted on the horizontal bar on the outside of the trunk for instant use. The horizontal bar is connected to the hinge by a resilient cord. The horizontal bar mounting provides a rear anchor point for the canopy that is placed over the car between the rear anchor point and the front of the car.

A second horizontal bar, a roll bar, is available adjacent the rear horizontal bar for placing the canopy over the entire surface of the auto from the rear of the auto to the front of the auto. The entire canopy is rolled up on the second horizontal bar. The roll bar is rolled over the auto while the user walks towards the front of the auto unrolling the canopy over the entire auto length. The canopy and the roll bar have front horizontal anchors which are in position for anchoring the front horizontal roll bar on the second horizontal bar to the front of the auto. Two hooks are used as the anchoring means. One of the anchoring means is at the extreme left and the other anchoring means is at the extreme right of the roll bar. The hooks are attached to resilient cords. The resilient cords are attached to the entire length of the canopy. The resilient or elastic cords react to the downward pressure of attaching hooks to the contour the canopy neatly and tidily to the auto.

It is an object of this invention to provide a canopy for use in an auto that is connected to the inside of the trunk of the auto.

It is another object of this invention to provide a canopy with two bars, one of which is connected to an end of the canopy.

It is another object of this invention to provide a bar on which one may roll up the canopy and a second bar as an anchor at the trunk of the car.

A further object of the invention is to provide a resilient cord attachment between one bar and the inside of the trunk to fix the position of the bar as an anchor when the canopy is used.

In accordance with these and other objects which will be apparent hereinafter, the instant invention will now be described with particular reference to the accompanying drawings.

The purpose of using the Roll Bar System in the present invention methods is that it eliminates having to store a canopy in a unready and awkward folded position which would defeat the purpose of the easy access ready application. This Roll Bar System has the added advantage of being able to apply the canopy to an automobile surface in moments by a single person. Prior art devices required lengthy unfolding process to place the bulky material on a car. Such a process did not lend itself to daily use let alone use by a single person attempting to place a canopy over the auto. The present invention uses a Weather Shield Canopy made of 2 ounce highly durable material which is shielded with an ultra-violet coating to protect the automobile from the sun's highly destructive rays. This material has a zero-porosity density factor which will not permit dirt or sediment to pass through on to the car's finish. The material used is fire retardent in order to meet CPA 1-84. The material is also mildew resistant and waterproof. This material is bonded every $\frac{1}{4}$ inch to resist tearing and provide high durability.

The Weather Shield or canopy is designed to be self-ventilating, self-fitting and self-contouring, in order to provide for ease of use. The canopy is light weight and strong.

The present car port is constructed and designed to simplify the process of protecting cars. The present device is fast to place on the car and fast to take off the car to facilitate protection of the automobile against the weather elements.

The self-ventilating system solves a multiplicity of problems. Present cover type unit may cause as many problems as they were meant to solve, such as locking in heat and moisture beneath the canopy. Heat and moisture may result in rust, mildew and fungus. Dirt settles on top of older covers and passes through the cover onto the car. Ultra-violet rays will readily pass through the unshielded material used in old canopies to oxidize the auto paint.

The present invention may keep a car cooler in a hot climate.

Weather Shield with its self-ventilating configuration will solve many of the problems and in addition it will permit a person to access the vehicle without removing the Weather Shield canopy.

In accordance with these and other objects which will be apparent hereinafter, the instant invention will now be described with particular reference to the accompanying drawings.

DESCRIPTION OF DRAWINGS

FIG. 1A is a perspective view of the portable car port in the trunk of a car.

FIG. 1B is a close up detail illustration of the hinge connection. FIG. 2 is an illustration of the rear of automobile illustrating self mounting horizontal bar.

FIG. 3 is a plan view of product not attached to the car.

FIG. 4 is a side view of ultra-violet shielded portable car port mounted on automobile.

FIG. 7 is an enlarged view of a rolling pin handle connected to roll bar, relatively movable in relation to roll bar.

FIG. 8 is an enlarged view of another embodiment of canopy on top auto.

DESCRIPTION OF THE PREFERRED EMBODIMENT

Figure 5A:
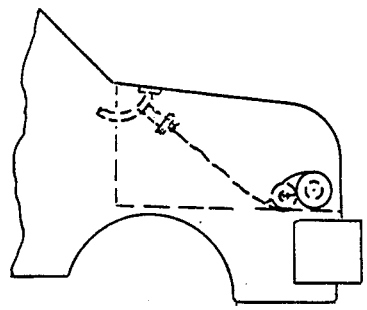
FIGS. 5A, 5B, 5C, 5D and 5E is an illustration of the portable carport in the trunk, FIG. 5A, with the horizontal bar and roll bar just outside of the trunk, FIG. 5B, with the roll bar moving forward over the trunk, FIG. 5C, with the roll bar moving over the car top, FIG. 5D, and the roll bar at the front of the vehicle, FIG. 5E.
Figure 5B:
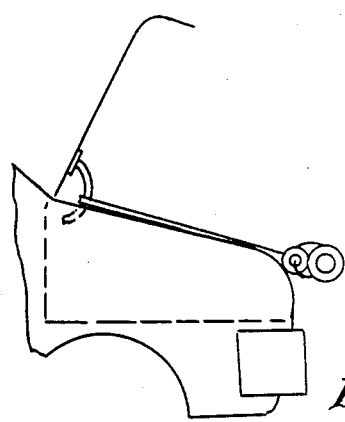
Figure 5C:
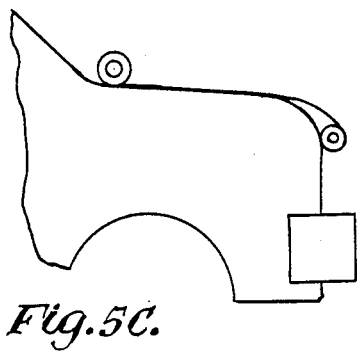
Figure 5D:
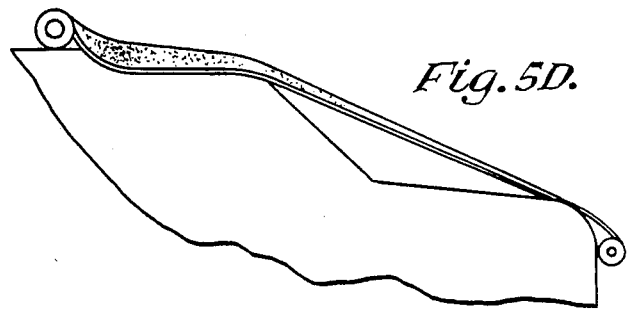
Figure 5E:
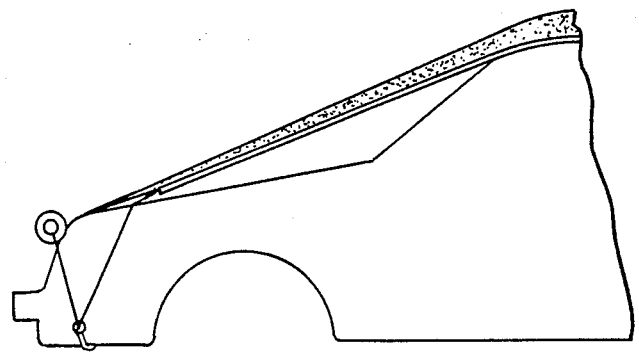
Figure 6A:
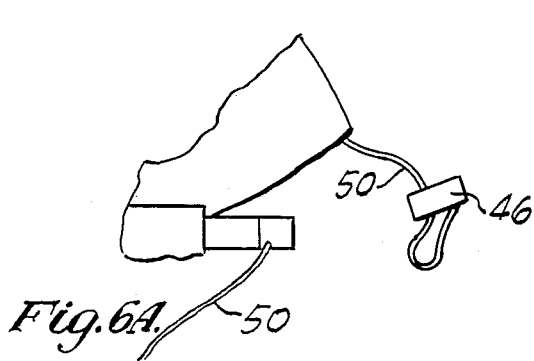
FIGS. 6A and 6B illustrate details of the horizontal bar and the roll bar respectively.
Figure 6B:
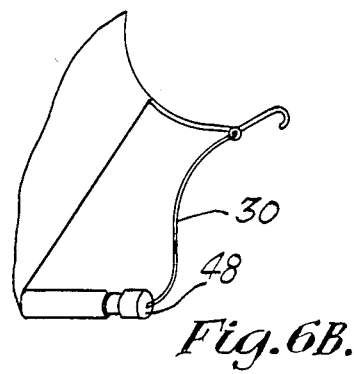
Figure 9:
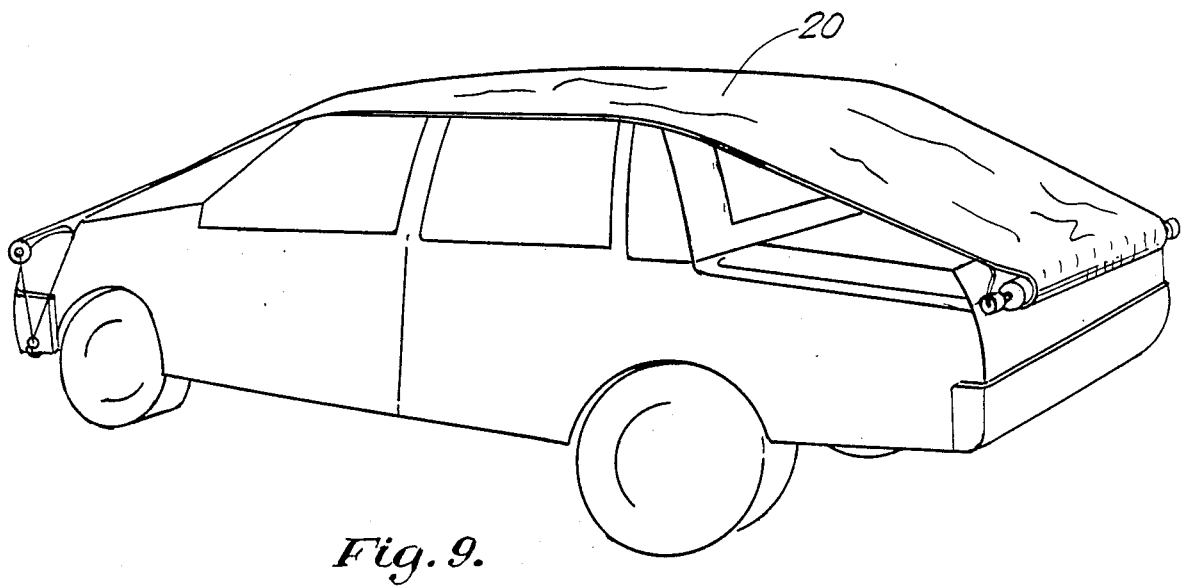
FIG. 9 is an illustration of the canopy on an auto.

The portable car port 10 used as a weather shelter. The car port is lightweight and instantly available for use and easily stored and easily used. The car port 10 is self contained and is stored in the trunk area 13 of an automobile 14. This car port is simply attached to an interior auto trunk hinge 15 and 15 for trunk 12. When the car port is removed from the trunk of the auto or car and the trunk lid is closed, one portion of the car port will be automatically mounted on the horizontal bar on the outside of the trunk for instant use as shown in FIG. 2. The horizontal bar 16 mounting provides a rear anchor point for the canopy 20 of the portable car port. A second horizontal bar, a roll bar 18, is available adjacent the rear horizontal bar for placing the canopy 20 over the entire surface of the auto 14 from the rear 22 of the auto to the front 24 of the auto. The roll bar 18 is rolled over the auto 14 while the user walks towards the front of the auto unrolling the canopy over the entire auto length. The canopy 20 and the roll bar 18 has front horizontal anchors 26 and 28 which are in position for anchoring the front horizontal roll bar at the end of the canopy to the front of the auto. Two hooks 26 and 28 are used as the anchoring means. One is at the extreme left and one is at the extreme right of the roll bar. The hooks 26 and 28 are attached to resilient cord 30 and 32. The resilient cord is also attached to the perimeter of the canopy along the entire length of the canopy at 34 and 36. The resilient or elastic cord reacts in a manner to generally contour the canopy neatly and tidily over the auto as shown in FIG. 4 when the cord is attached to the rear of the car and the front of the car by the attaching hooks.

Referring to FIGS. 3 and 4 this invention relates to the protection of an automobile 14 by means of a device 20 which shields the upper portion and interior of the automobile from adverse weather conditions and other natural elements harmful to an automobile exterior such as sap and bird droppings. The device is designed such that it provides this protection while simultaneously facilitating ease of use, access to said vehicle through the doors, and convenience of storage of shielding device.

The car port 10 includes a non-porous, ultra-violet shielded fabric 20 of such dimensions so as to cover the entire upper portion of an automobile 14. The fabric may be 13' to 28' in length 4' to 7' in width. At each lengthwise end of said fabric or cover 20 is folded back at 12 upon itself approximately 4" and sewn in such a manner as to form a loop 16 and loop 18 width wise. In each loop is inserted a tubular rod 16 or rod 18 to be described. Along the length of said fabric a similar loop is fashioned folding fabric back approximately ¾" upon itself and sewing the inner edge, to be known as contouring channel 38 and channel 40.

Two pieces of a tubular rod 16 and 18, ½" to 2" in diameter and of a material and thickness such that it is of a semi-rigid nature, and of a length equal to or less than the width of the vehicle 14 for which it will be used. Each of two rods 16 and 18 shall be specifically for use at either the front or rear of the automobile 14.

Rear rod 16 is enclosed in a rubberized or foam material 42 and the front rod 18 is enclosed in a rubberized or foam material 44 which has been fabricated in tubular fashion, interior diameter to be no greater than diameter of tubular rod, thickness equal to ¼" to 2". Length to be less than or equal to that of rod 16 and rod 18. Each rod is capped at both ends, caps 46, 46, 48 and 48 fabricated of high strength material and to be referred to as end caps.

Each of the rods have two (2) holes drilled through a single wall 1"–5" from ends of rod, drilled both radially to center of rod and drilled on a line on surface of rod parallel to the center line of said rod's diameter. The end caps to have holes drilled in the center and removably attached to rods. The front rod is fashioned exactly as rear rod with the single exception of the two holes drilled through rod wall. Each assembled rod is to be incorporated into said fabric as follows. The Fabric of specified length is to be tapered at both ends widthwise so that width at end of fabric is less than length of the rod 16 or 18. Each end of fabric is to be folded back so as to overlap itself widthwise on the same side, said fabric to be sewn so as to form a pocket 12 suitable for assembled rod to be inserted snuggly. Rods to be inserted and positioned so the lengthwise center of rod and widthwise center of fabric are aligned.

In each of holes drilled through rear rod wall is to be inserted a shock cord of the following characteristics: 2'–5' in length of elastic nature so as to stretch under tension and return to former length when tension is removed, and shielded by an outer protective fabric; after insertion the end of cord is tied in a simple knot so as to prevent that end of the cord from being removed from rod caps 48 and 48' and caps 46 and 46'.

The opposite end of cord 50 and 50' to be attached to trunk hinge 15 and 15' of automobile, attachment means described as follows: A rigid plastic clip ⅛"-¼" in thickness, 1"–2" in length having rounded ends and two holes in the center with approximately ¾" between the center of the holes. The free end of said cord is inserted through one hole in clip 52 and 52', looped around trunk hinge 15 and 15', inserted in remaining hole in clip and knotted.

Two additional lengths of said shock cord 14'–29' each inserted through end cap on rear bar 16 and knotted. Each cord runs from end cap through the contouring channel located on the corresponding side of fabric, through corresponding end cap on front bar and knotted. A portion of cord between contouring channel and front end cap has been folded, the end of fold inserted in the eyelet of a hook, looped around the base of the hook and the slack pulled taut so as to lock the hook into desired position on length of cord.

This system as shown in FIG. 1 is employed to effect the simplest form of attachment. The unique characteristic about this system 10 is that it relates to a common denominator in all automobiles 14—the trunk 12' lid hinge. This attachment uses a piece of elastic cord looped around the trunk lid hinge 15 and 15', attached by a two hole adjustable clip, the purpose for this was to be able to install the portable carport easily without the use of clamps, nuts or bolts and drilling holes, etc., and permits this unit to be installed on any and all automobiles that have a trunk lid hinge or hatchback, regardless of design. This system has three parts —the shock cord, clip and uses trunk lid hinge.

FIG. 2 shows the self mounting lock bar which is an automatic self-mounting bar 16 which locks itself to the back of the automobile. The elastic cord 50 and 50' is clamped in the closed trunk lid 12'. Again, this unique design provides a simplistic method of mounting a bar to an automobile in order to provide a point from which material can be attached. The purpose of using this is because it is adoptable to all automobiles and provides an instant mounting point regardless of design without the use of drilling, bolts, clamps, hinges, etc. The self-mounting lock bar provides a simple and efficient method of allowing the portable carport to go on the automobile very rapidly and is a major key in making this system ultra-convenient to use. Other methods of carporting and covering are very cumbersome and time consuming by comparison and a mounting point for a canopy can require nuts, bolts, drilling and some cases fabrication. This system has four parts-the shock cord, clip, hinge attach and padded lock bar.

FIG. 3 shows the roll bars at (self mounting one end and lock bar) the other end of the canopy. This roll bar device is an ultra-efficient and simple method of applying and removing the weather shield canopy from the surface of an automobile. Built into its functional simplicity of distributing material, is the convenience of a tidy, compact storage appartus, as all material is wrapped around the Roll Bar. The very presence of this Roll Bar provides an everyday, neat and tidy method to erect the Portable Carport over any automobile, therefore making this product an appliance that can be used daily and applied in seconds.

Figure 10:
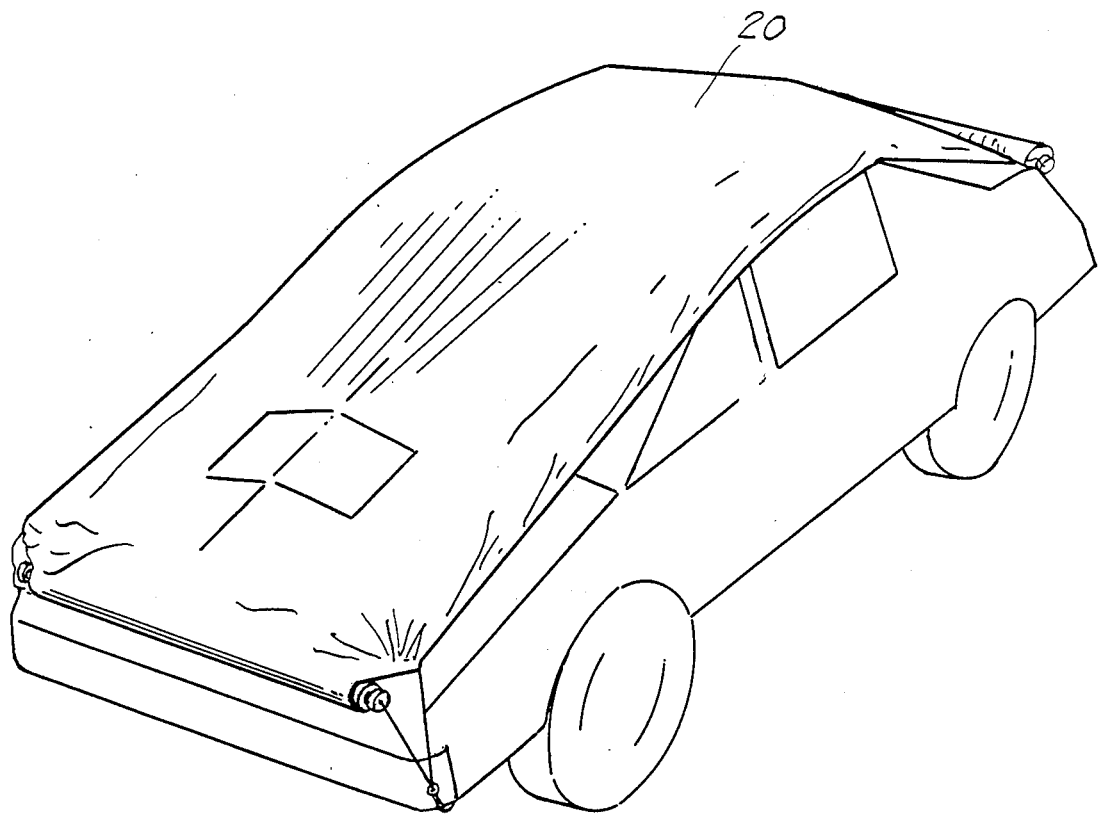
FIG. 10 Illustration of canopy as advertising mounting.

The cord shown in FIG. 10A at X may be pulled further through the end cap 48 and reknotted to shorten length of cord 34 to allow canopy to be placed further down the side of the car towards the ground from the position shown in FIG. 4.

It should be noted that after unhooking the front and rolling the canopy 20 up on the roll bar 18 to the rear self mounting position of the lock roll 16, and when the user opens the trunk, the car port will be drawn in to the trunk for storage by the biasing cord.

The car port is designed to provide a self ventilating canopy. The wind can lift the canopy off the top of the car by wind moving through the openings shown in FIG. 4 and FIG. 8 at numeral 100.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A portable car port comprising:
   a light weight weather shelter canopy,
   an anchor means for connection inside an automobile trunk for storage of the car port in the trunk of an automobile,
   said anchor means includes a rear bar connected to said anchor means, said canopy connected at one end to said rear bar,
   a roll bar means connected to the other end of said canopy for placing the canopy in a rolled up condition on said roll bar means and for unrolling said canopy over the automobile from said rear bar to the front of the automobile,
   a front anchor means connected to said roll bar means for anchoring said roll bar at the end of said canopy to the front of the auto.

2. A portable car port comprising:
   a light weight weather shelter canopy,
   an anchor means for connecting inside an automobile trunk for storage of the car port in the trunk of an automobile,
   said anchor means includes a rear self mounting lock bar connected to said anchor means, said canopy connected at one end to said rear bar,
   a roll bar means connected to the other end of said canopy for placing the canopy in a rolled up condition on said roll bar means and for unrolling said canopy over the automobile from said rear bar to the front of the automobile,
   a front anchor means connected to the other end of said canopy for anchoring said roll bar at the end of said canopy to the front of the auto,
   said anchor means including a biasing means for connection at one end inside the automobile trunk and at the other end to said lock bar,
   said biasing means constructed and arranged to be stretched and locked by closing the automobile trunk for self mounting said lock bar.

3. A portable car port as set forth in claim 2 wherein said anchor means includes an adjustable Universal Trunk Hinge attachment.

4. A portable car port as set forth in claim 3 wherein said lock bar when locked outside the automobile trunk becomes the anchoring point for said canopy.

5. A portable car port as set forth in claim 4 wherein said canopy includes an adjustable side tension system in order to tighten canopy on automobile.

6. A portable car port as set forth in claim 4 wherein said roll bar provides means to conveniently distribute material over car's surfaces.

7. A portable car port as set forth in claim 1 including biasing hook means connected to said roll bar to provide a self fitting and self contouring system.

8. A portable car port as set forth in claim 1 wherein said canopy is constructed as an ultra-violet shielded material.

9. A portable car port as set forth in claim 8 wherein said car port is a self ventilating system.

* * * * *